United States Patent [19]

Engelke et al.

[11] Patent Number: 5,581,593

[45] Date of Patent: Dec. 3, 1996

[54] COMBINATION TELEPHONE AND ALPHANUMERIC ENTRY DEVICE

[75] Inventors: Robert M. Engelke, Madison; Kevin R. Colwell, Middleton; Troy Vitek, Madison, all of Wis.; Mark Terranova, Coral Springs, Fla.; Chuck Burk, Bedford, N.H.; Peter Fowler, Coconut Creek, Fla.; Mike Hoghooghi, Boca Raton, Fla.; Karen M. Holmes, Boynton Beach, Fla.; Wendy Scott, Boca Raton, Fla.; Roy Weidig, Delray Beach, Fla.; Chris Mitchell, Royal Palm Beach, Fla.

[73] Assignee: Ultratec, Inc., Madison, Wis.

[21] Appl. No.: 369,205

[22] Filed: Jan. 5, 1995

Related U.S. Application Data

[63] Continuation-in-part of Ser. No. 258,044, Jun. 10, 1994.

[51] Int. Cl.[6] .......................... H04M 11/00; H04M 1/00
[52] U.S. Cl. .................. 379/52; 379/96; 379/97; 379/354; 379/355; 379/57
[58] Field of Search .............................. 379/93, 96, 97, 379/52, 354, 355, 356, 57, 61, 58, 59

[56] References Cited

U.S. PATENT DOCUMENTS

| | | | |
|---|---|---|---|
| Re. 32,365 | 3/1987 | Sebestyen | 340/311.1 |
| 3,507,997 | 4/1970 | Weitbrecht . | |
| 3,896,267 | 7/1975 | Sachs et al. . | |
| 3,976,995 | 8/1976 | Sebestyen | 340/337 |
| 4,126,768 | 11/1978 | Grenzow | 379/357 |
| 4,201,887 | 5/1980 | Burns . | |
| 4,268,721 | 5/1981 | Nielson et al. | 379/52 |
| 4,415,065 | 11/1983 | Sandstedt | 186/39 |
| 4,451,701 | 5/1984 | Bendig | 379/96 |
| 4,503,288 | 3/1985 | Kessler | 379/96 |
| 4,569,421 | 2/1986 | Sandstedt | 186/39 |
| 4,625,080 | 11/1986 | Scott | 379/104 |
| 4,799,254 | 1/1989 | Dayton et al. | 379/97 |
| 4,839,919 | 6/1989 | Borges et al. | 379/96 |
| 4,918,723 | 4/1990 | Iggulden et al. | 379/100 |
| 4,926,460 | 5/1990 | Gutman et al. | 379/57 |
| 4,951,043 | 8/1990 | Minami | 340/825.44 |
| 4,959,847 | 9/1990 | Engelke et al. | 379/52 |
| 4,995,077 | 2/1991 | Malinowski | 379/355 |
| 5,081,673 | 1/1992 | Engelke et al. | 379/98 |
| 5,091,906 | 2/1992 | Reed et al. | 370/94.1 |
| 5,121,421 | 6/1992 | Alheim | 379/52 |
| 5,163,081 | 11/1992 | Wycherley et al. | 379/52 |
| 5,192,947 | 3/1993 | Neustein | 340/825.44 |
| 5,249,220 | 9/1993 | Moskowitz et al. | 379/93 |
| 5,280,516 | 1/1994 | Jang | 379/57 |

(List continued on next page.)

FOREIGN PATENT DOCUMENTS

| | | |
|---|---|---|
| 2749-923 | 5/1979 | Germany . |
| 60-259058 | 12/1985 | Japan ........... 379/90 |
| 93/23947 | 11/1993 | WIPO ........... 379/52 |

OTHER PUBLICATIONS

The Article "Customer Equipment For Radiopaging" pp. 292–293, Jam. 1987.
Moskowitz, J., "Telocator Alphanumeric Protocol", 1993.
Motorola, "Using Your WordSender", 1994.

*Primary Examiner*—Jason Chan
*Attorney, Agent, or Firm*—Quarles & Brady

[57] ABSTRACT

A combined telephone AED simply integrates the function of a telephone and an alphanumeric entry device required for alphanumeric paging into a single unit by making use of the handset cradle switch to reset the unit from page mode to telephone mode whenever the handset is lifted. Paging operation is simplified through pre-stored entries in a directory giving both voice and paging numbers with the appropriate number being identified by the previously selected mode of the operation of the unit. Special purpose paging and speed dial buttons serve the combined function of identifying a mode of operation and initiating a search of the directory to reduce the number of keystrokes required of a user during typical operation.

10 Claims, 3 Drawing Sheets

U.S. PATENT DOCUMENTS

| | | | |
|---|---|---|---|
| 5,325,417 | 6/1994 | Engelke et al. | |
| 5,327,479 | 7/1994 | Engelke et al. | |
| 5,339,358 | 8/1994 | Danish et al. | 379/368 |
| 5,343,519 | 8/1994 | Feldman | 379/355 |
| 5,351,288 | 9/1994 | Engelke et al. | 379/98 |
| 5,359,651 | 10/1994 | Draganoff | 379/354 |
| 5,377,263 | 12/1994 | Bazemore et al. | 379/355 |
| 5,396,650 | 3/1995 | Terauchi | 455/38.2 |

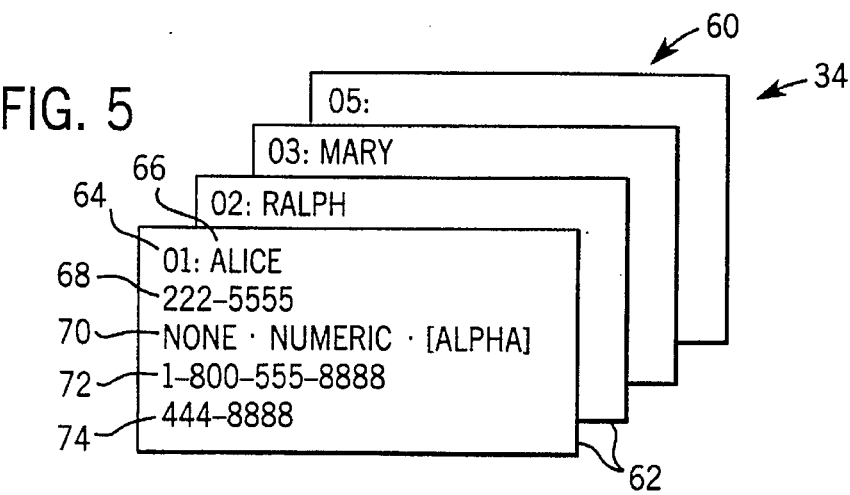
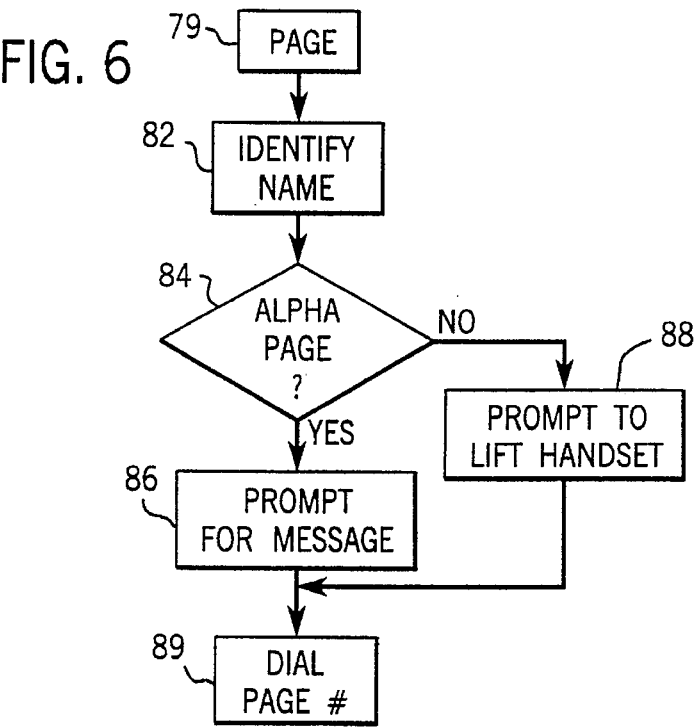
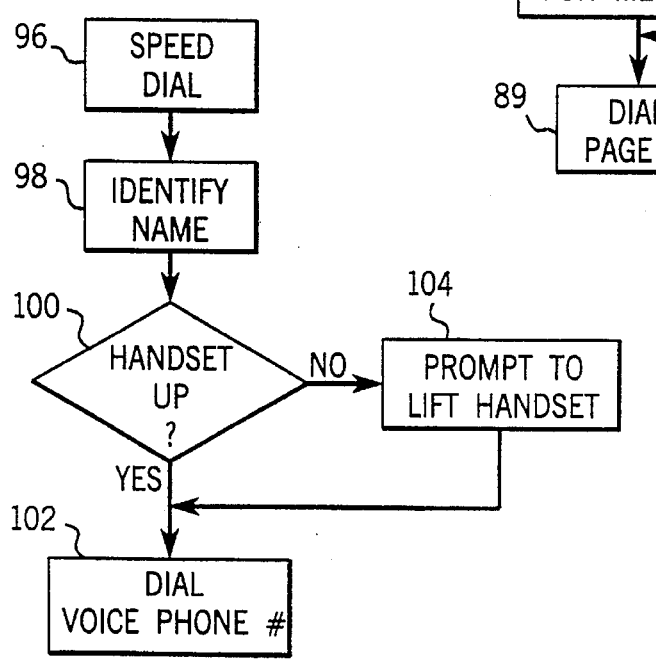

COMBINATION TELEPHONE AND ALPHANUMERIC ENTRY DEVICE

CROSS REFERENCE TO RELATED APPLICATION

This application is a continuation-in-part of U.S. application Ser. No. 08/258,044 filed Jun. 10, 1994 entitled Telephone With Unified Features For Hearing and Deaf Users hereby incorporated by reference.

FIELD OF THE INVENTION

The present invention relates to telephones having text transmission capability and, in particular, to voice telephones adapted for use in sending messages to alphanumeric pagers.

BACKGROUND OF THE INVENTION

Pagers are compact radio receivers, typically incorporating a display, that may be carried on a person, to receive and display short radio messages directed to that pager. The messages are normally originated by a person who calls a particular telephone number of a paging service and is connected, directly or indirectly, to a radio transmitter which broadcasts the desired message coded to be received only by the intended pager.

Pagers may be divided into numeric pagers and alphanumeric pagers. For a numeric pager, a caller dials a unique telephone number assigned to that pager. When that call is connected, the user is instructed to enter the digits of a telephone number that the owner of the pager should call. These numbers are entered using the keypad of the telephone and are encoded in dual tone modulated frequency encoding ("DTMF") used by most tone dialing telephones. A message incorporating the telephone number entered by the caller is automatically transmitted to the pager associated with the number dialed by the caller.

One advantage of a numeric paging system is that the caller may use a conventional telephone.

For an alpha-numeric pager, the caller dials a number common to many pagers. To identify the particular pager to which a message is to be sent, the caller then enters a pager identification number ("PIN") unique to that pager. A short alpha-numeric message (numbers and/or letters) may be entered and transmitted to the indicated pager.

While the ability of the alpha-numeric pager to receive messages composed of both letters and numbers is an advantage over the numeric pager, this feature requires the caller to have access to a specialized alphanumeric entry device ("AED"). In contrast to a standard telephone, an AED incorporates a full typewriter-type keyboard of all letters and numbers. Further, the AED incorporates a text-type modem which encodes letters and numbers for transmission over the telephone lines according to an ASCII protocol and with a modulation system different from the DTMF system employed by a standard telephone to encode digits used for dialing.

The need for a specialized AED to initiate calls to an alpha-numeric pager substantially limits the flexibility of the alpha-numeric pager.

SUMMARY OF THE INVENTION

The present invention incorporates the features of an AED into a standard telephone that may be used not only to make direct calls to alphanumeric pagers, but to make normal voice calls and to function in all other ways like a standard telephone. Key to this integration is the present invention's method of incorporating the increased functionality of the AED into a telephone so as to preserve the intuitive operation of the standard telephone. For example, in the present invention, a user who is unaware of or who does not wish to use the AED features of the combined unit may operate it exactly like a standard telephone. Calls placed on the combined unit are initiated by lifting the handset and dialing, like a standard telephone. Calls received by the combined unit may be answered simply by removing the handset as one intuitively reacts with a standard telephone.

Further, the protocol for using the function of the AED employs a pre-stored list of pager numbers and codes, invoked automatically by hardwired mode keys, to enable the AED features to be invoked simply with a minimum number of keystrokes.

Specifically, the present invention provides a combination telephone and AED unit that has a keyboard for developing key signals in response to typing by a user, the keys including a page mode key and a speed dial key. A modulator provides for the transmission of both telephone signals and paging signals on a phone line, and an electronic memory holds names of people who can be called, linked to a voice telephone number and/or a paging telephone number. A microprocessor communicating with the keyboard, modulator, and memory operates according to a stored program to receive key signals identifying a name and to search the electronic memory to identify at least one of a voice telephone number and a pager telephone number linked to the name. If the page mode key is pressed and a pager telephone number has been obtained, the pager telephone number is returned to the user. If on the other hand, the speed dial mode key is pressed and a voice telephone number has been obtained, the voice telephone number is returned to the user. The returned number may be used to initiate an automatic dialing of the number. Other paging codes may also be stored with the paging number.

It is thus one object of the invention to simplify the paging process by pre-storing essential data, like the paging numbers and codes, and yet to eliminate the potential confusion of having two sets of numbers, one for paging and one for calling, both associated with a single name, by automatically selecting the proper number according to a context identified by a page mode or speed dial key. In normal operation, the user pressing the speed dial key obtains a voice number without awareness of the paging number.

The microprocessor initiates a search for paging or voice phone numbers and other data, automatically, upon the pressing of either the page mode key or the speed dial key. The user is prompted to identify a name, and a number is automatically returned.

It is another object of the invention to minimize the keystrokes required to invoke the operation of speed dialing or paging. By combining the identification of the mode (via the preassigned mode keys) with the command for searching the electronic memory, a separate search command is eliminated and the user is shielded from superfluous data (e.g., paging data when a voice call is being made) because the mode has been clearly identified.

The handset may fit within a cradle when not in use, the cradle being attached to a handset switch providing a handset up signal when the handset has been removed from the cradle. Telephone line interface circuitry transfers telephone signals (e.g., DTMF signals) between the keyboard and the telephone line in a telephone mode and transfers digital paging signals between the keyboard and a telephone line in a paging mode. The microprocessor communicating with the interface circuitry, the keyboard, and the handset switch causes the selection of the pager mode in response to the page mode key and causes selection of the telephone mode in response to the handset up signal regardless of the selection of the pager mode key.

Thus it is another object of the invention to integrate the AED capabilities with the operation of a standard telephone. The intuitive response to a user of a telephone to initiate or answer a call is to lift the handset. Thus this handset signal is used to automatically switch the mode of the combined unit to the telephone mode to satisfy the expectations of the casual user.

The foregoing and other objects and advantages of the invention will appear from the following description. In the description, reference is made to the accompanying drawings which form a part hereof and in which there is shown by way of illustration, a preferred embodiment of the invention. Such embodiment does not necessarily represent the full scope of the invention, however, and reference must be made therefore to the claims herein for interpreting the scope of the invention.

BRIEF DESCRIPTION OF THE DRAWINGS

FIG. 5 is a graphic representation of information contained in the telephone list stored in the memory of FIG. 2 and used for simplifying the use of the AED functions;

FIG. 6 is a flow chart of the program executed by the microprocessor of FIG. 2 during a paging operation by the user; and FIG. 7 is a flow chart similar to that of FIG. 6 but for speed dial operation of the present invention.

DETAILED DESCRIPTION OF THE PREFERRED EMBODIMENT

Hardware

Figure 1:
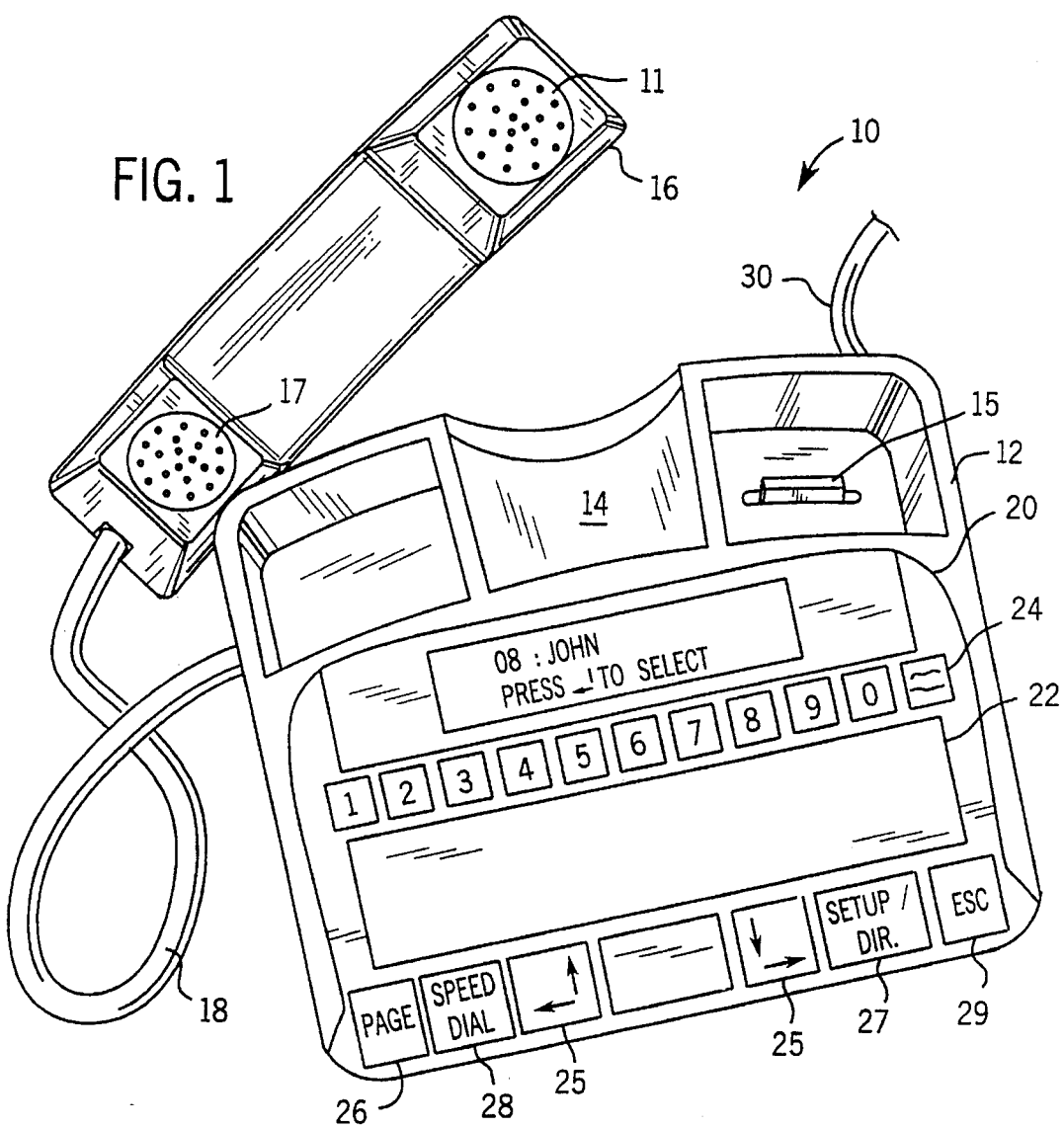
FIG. 1 is a perspective view of a combined telephone AED according to the present invention.
Figure 2:
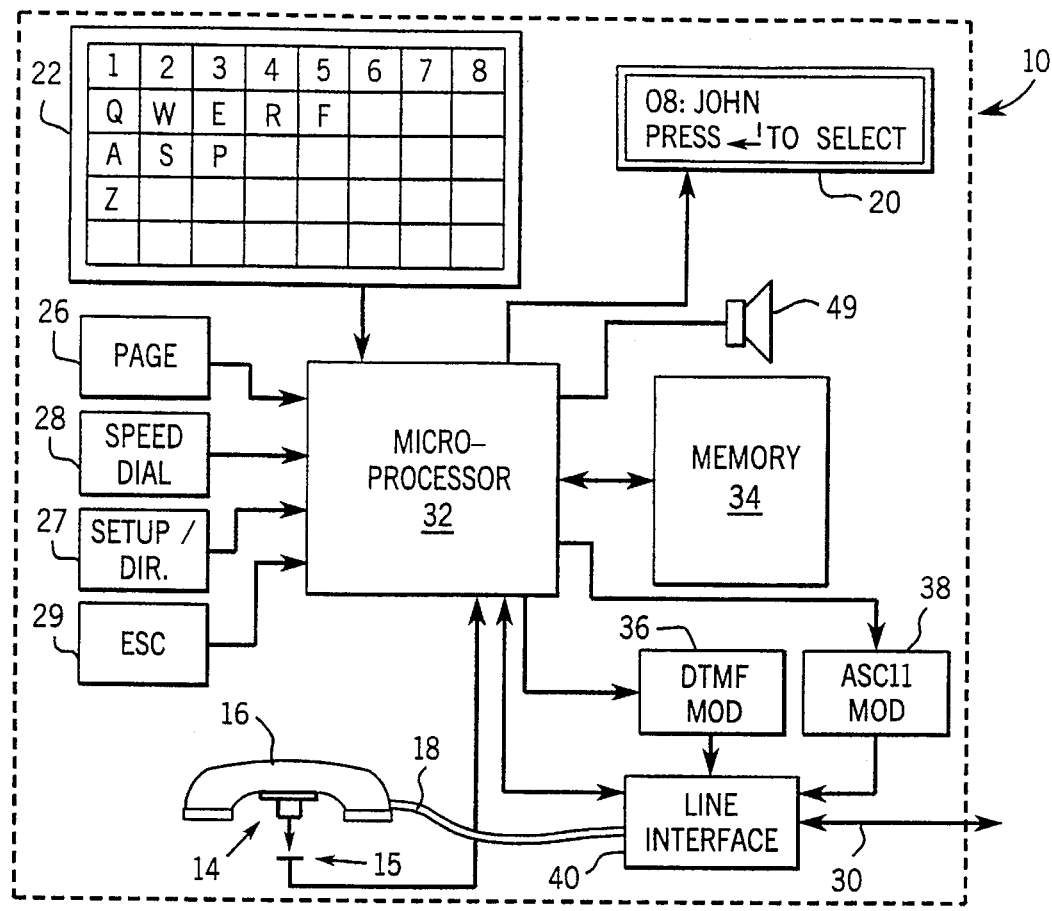
FIG. 2 is a schematic block diagram of the major components of the combined telephone and AED of FIG. 1 showing a microprocessor and an internal memory used to store a directory of paging and voice telephone numbers according to names, and storing a program executed by the microprocessor.

Referring to FIGS. 1 and 2, a combined AED/telephone unit 10 has a housing 12 exposing at its rearmost upper surface, a cradle 14 supporting a conventional telephone handset 16 having a mouthpiece microphone 17 and an earpiece speaker 11 as is well understood in the art. The microphone 17 and speaker 11 of the handset 16 are connected by a flexible electrical cable 18 to circuitry within the housing 12 as will be described below.

When the handset 16 is in place in the cradle 14, it depresses a cradle switch 15 providing an electrical signal indicating that the handset 16 is in place in the cradle 14. The term handset, as used herein should be considered to embrace not only traditional handsets intended to be held next to the head but also their equivalent structure such as wearable microphone/headphone combinations and stationary microphone speaker sets such as are found in speaker phones and the like.

A standard QWERTY keyboard 22 formed of rows and columns of electrical pushbuttons is presented at the frontmost upper surface of the housing 12. Three rows of the keyboard 22 comprise letters. A fourth, top row 24 comprises the Arabic numerals from 0 to 9, much in the fashion of a standard typewriter or computer keyboard.

Between the cradle 14 and the keyboard 22 and tipped upward and forward so as to be visible to a user of a keyboard 22 is a two line liquid crystal "LCD" display 20 suitable for the display of both numbers and letters.

Special "PAGE", "SPEED DIAL", "SET UP/DIRECTORY" and "ESCAPE" and cursor pushbuttons 26, 28, 27, 29 and 25, respectively, are positioned at the bottom of the keyboard 22. The combined unit 10 is connected to the telephone lines 30 by means of a standard telephone jack (not visible in FIG. 1) at the rear of the housing 12.

When the combined unit 10 is used as a telephone, the handset 16 may be removed from the cradle 14 and voice conversations undertaken. When used as an AED, text prompts are displayed on the display 20 and paging messages are typed in by the user on keyboard 22. The display 20 and keyboard 22 may also be used to enter and retrieve data in a telephone number directory described below. Editing of the text on the display 20 may be performed by use of the cursor keys 25 which maneuver a cursor on the display 20. The cursor keys 25 may also be used to select from menu items displayed on the display 20.

Dialing of the combined unit 10 may be done by using the numeric key row 24 which has imprinted above each number the three letter series found on a standard telephone (for use in cases where a telephone number includes letters). Distinguishing between the use of the upper keyboard row 24 for dialing or for entering numeric characters is done by context in reference to the mode in which the combined unit 10 is operating as will be described further below.

Referring still to FIGS. 1 and 2, the display 20 and keyboard 22 are connected to a microprocessor 32, which receives digital data from the keyboard 22 representing alphanumeric characters or the special commands of keys 25–29, and which provides alphanumeric data to be displayed on the display 20 as is well understood in the art. Microprocessor 32 also receives data from the cradle switch 15 indicating whether the handset 16 is in position on the cradle 14 or not and communicates with a memory 34 which holds a stored program executed by the microprocessor 32 as well as telephone numbers in a directory to be described. Memory 34 is a commercially non-volatile, random access computer memory. A speaker 49 is connected to the microprocessor to permit the generation of ringing signals familiar to users of standard telephone equipment.

The microprocessor 32 also exchanges signals with a DTMF modulator 36 which provides the necessary tones for dialing a number on a telephone exchange and an ASCII modulator 38 which provides standard modem tones used to communicate alphanumeric characters in an alphanumeric paging application. Such modulators are well understood in the art and may be combined into one circuit.

Each of these modulators 36 and 38 and the flexible cable 18 from the handset 16 are connected through line interface circuitry 40 to the telephone line 30. The line interface circuitry 40 serves to match the signals from the modulators 36 and 38 and from the handset 16 to the telephone line 30 both in terms of wire number and impedance, as is understood in the art. A control line from the microprocessor 32 to the line interface circuitry 40 permits the microprocessor 32 to mute signals from the handset 16 when the ASCII modulator 38 is operating to prevent interference from these two sources.

Configuration of the Hardware in Different Operating Modes

During operation, the microprocessor 32 executes a program stored in memory 34 to control the keyboard 22, the display 20, the modulators 36 and 38, and the line interface 40 according to one of four major operating modes.

TABLE I

| Mode Name | Operation |
|---|---|
| Idle | Monitor keyboard, handset and phone line |
| Telephone | Receive and Transmits Voice Messages Per a Standard Telephone |
| Page | Initiate a Call to a Pager |
| Speed Dial | Automatically Dial a Number Based on a Name Identified by a User |
| Setup/Directory | Edit a Directory of Paging and Voice Numbers |

Generally during operation in the telephone mode, the microprocessor 32 receives dialing information from the keyboard 22 or from a directory stored in memory 34 (to be described) to control the DTMF modulator 36 to produce the necessary dialing tones over the telephone line 30. The handset 16 is connected to the line 30 so as to provide normal voice telephone communication.

During paging mode and for a numeric page, the microprocessor 32 performs similar operations to telephone mode in dialing a number and in connecting the handset for voice communications. For an alphanumeric page, the microphone of the handset 16 is muted and the microprocessor accepts a message from a user typed in through the keyboard 22. This message is transmitted via the ASCII modulator 38 over the phone line 30.

During setup/directory, and speed dialing modes, the microprocessor 32 receives information from the keyboard 22 and displays prompts on the display 20 in response to searching or editing a directory in the memory 34. In the setup/directory and speed dial modes, no connections are made to the telephone line 30. After the speed dial mode, the combined unit 10 switches to the telephone mode and is connected to the phone lines 30 as a conventional telephone and the speed dial number used to modulate the DTMF modulator 36 to dial a speed dial selected number.

Operating Software

Figure 3:
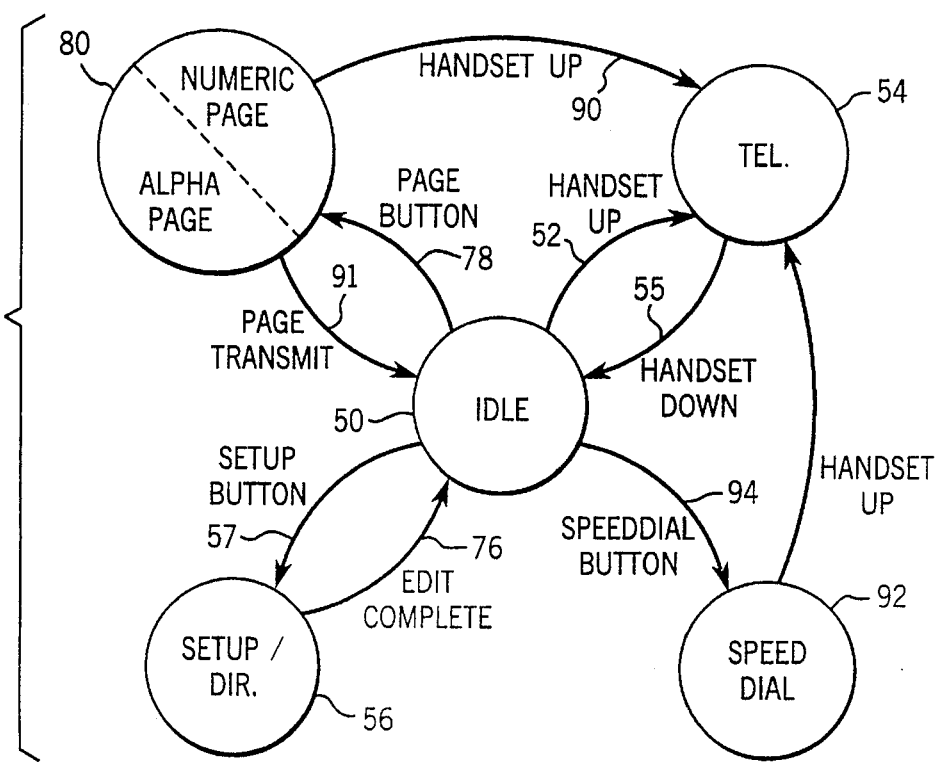
FIG. 3 is a state chart showing states of the program executed by the microprocessor of FIG. 2 in providing the combined functions of a telephone and AED.

Referring now to FIGS. 2 and 3, the combined unit 10 initially operates in the idle mode 50 under the direction of the program stored in memory 34. In this mode, as described above, the microprocessor 32 has configured the hardware of the combined unit 10 to match that of a standard telephone. Telephone line 30 is monitored by the line interface circuitry 40, a ringing signal which is detected by the microprocessor 32 to produce a ring tone on speaker 49. The cradle switch 15 is also monitored to connect the handset 16 to the line interface 40 to the telephone line 30 if the handset 16 is removed from the cradle, signaling the start of a telephone call.

If the handset 16 is lifted while the combined unit 10 is in the idle mode 50, as indicated by state change arrow 52, the combined unit 10 moves to the telephone mode 54, where the combined unit operates as a standard telephone. When the handset 16 is replaced when the combined unit is in telephone mode 54, the combined unit returns to the idle mode 50, as indicated by state change arrow 55.

Referring now to FIGS. 2, 3 and 5, if during the idle mode 50, the setup/directory key 27 is pressed, the combined unit 10 moves from the idle mode 50 to the setup/directory mode 56 as indicated by state change arrow 57. In the setup/directory mode 56, the user may enter data into a directory 60 stored in memory 34 as a set of up to 20 entries 62. Each entry 62 includes a speed dial number 64 (being identical with the number of the entry 62), a speed dial name 66 which is one or more letters, and is normally the name of the person being called. The speed dial number 64 and the speed dial name 66 constitute a searchable field in the directory 60, meaning that a user, identifying either the speed dial number 64 or the speed dial name 66, will obtain the remaining information in the entry 62. Either of the speed dial number 64 and the speed dial name 66 will be termed henceforth a name.

Each entry 62 optionally includes a voice telephone number 68, a pager identification type 70 indicating that the caller of that name has either no pager (NONE) a numeric pager (NUMERIC) or an alpha-numeric pager (ALPHA), a system number 72 (used only for alpha-numeric pagers), and a pager identification number 74 which, for numeric paging, is the telephone number of the pager.

The setup/directory mode 56 allows the information of each entry 62 to be initialized or changed at any time by the user using the keyboard 22 and the display 20. For example, upon pressing of the setup/directory key 27, the user receives a prompt on display 20 requesting that the user type in data on the keyboard 22 for each data element 66–74 of the entry 62 as required. At any time during this process, the escape key 29 may be pressed to save the entry 62 as edited in memory 34 and return to the idle mode 50. Otherwise as indicated by state change arrow 76, when all data elements 66–74 of the entry 62 are edited, the microprocessor 32 returns to the idle mode 50.

The directory entries 62 are important in making the operation of combined unit 10 manageable to a user of a standard telephone. By recording all the necessary paging information, including the type of paging and whether there is paging, paging can be performed quickly and simply.

Referring now to FIGS. 6 and 3, if the page key 26 is pressed while the combined unit 10 is in the idle mode 50 as indicated by state change arrow 78 of FIG. 3, and process block 79 of FIG. 6, the combined unit 10 moves from the idle mode 50 to the page mode 80. When in the page mode 80, the user is prompted to identify a name within the directory 60 as indicated by process block 82. That name may be either a speed dial number 64 or a speed dial name 66 as previously entered in the setup/directory mode 56. Once a name has been selected, the directory 60 is searched to find the relevant entry 62. If the pager identification type 70 of that entry 62, as previously entered by the user, indicates that the pager is an alphanumeric pager, then at decision block 84, the program of the microprocessor 32 branches to process block 86 where the user is prompted for an alpha numeric message via display 20. Otherwise, at decision block 84, the user is prompted to lift the handset at process block 88.

At process block 89, after the handset 16 is lifted at process block 88 or a message is input at process block 86, the paging number taken from the directory 60 (system number 72 for alphanumeric pagers and pager identification number 74 for numeric pagers) is used to dial the combined unit 10 to make a connection with the proper paging service.

In an alphanumeric page, the pager identification number 74 is automatically output by the combined unit 10 via the ASCII modulator 38 to identify the pager to be contacted, after connection is made with the paging service. The message input by the user at process block 86 is then output via the ASCII modulator 38.

In a numeric page, the user listening to the handset 16 which was lifted in response to the prompt of process block 88, inputs a telephone number for the paged person to call using the keyboard 22.

In either case, the user is largely shielded from the task of interfacing with the paging service by having the numbers automatically selected.

Referring again to FIG. 3, at the conclusion of the numeric paging, the handset is lifted up as indicated by state change arrow 90 and the combined unit 10 moves to the telephone mode 54 for telephonic communication between the user and paging service in completed the page. With an alphanumeric page, at the completion of the transmission of the message, the combined unit 10 returns to the idle mode 50 during normal operation as indicated by state change arrow 91.

Referring now to FIGS. 3 and 7, the speed dial mode 92 may be entered by pressing the speed dial key 28 indicated by state change arrow 94 of FIG. 3 and by process block 96 of FIG. 7. As with the paging, discussed above with respect to FIG. 6, the pressing of the speed dial key 28 indicates to the microprocessor 32 that a search of the directory 60 is to be undertaken and accordingly, the microprocessor 32 prompts the user through display 20 to identify a name as indicated by process block 98 either by speed dial number 64 or by the characters of the speed dial name 66. If the handset 16 is "up" as determined at decision block 100, the voice telephone number 68 of the entry 62 matching the name is dialed (per modulator 36) as indicated by process block 102. In this case, the number dialed is the telephone number not the paging number as deduced from the context of the speed dial key 28 having been pressed. If, at decision block 100, the handset is not lifted, a prompt is provided by the display 20 to the user to lift the handset 16 at process block 104 and then the number is dialed at process block 102.

Referring to both FIGS. 6 and 7, the use of the page key 26 or the speed dial key 28 to initiate these modes per process block 79 and 96 does double duty to identify the correct operating mode and to convey information that the directory 60 is to be searched. By eliminating the need to invoke the directory with a separate key and then to identify which of the numbers in the directory are relevant, normal paging is simplified and a level of speed dialing commensurate with the intuitive operation of a standard phone is provided.

Figure 4:
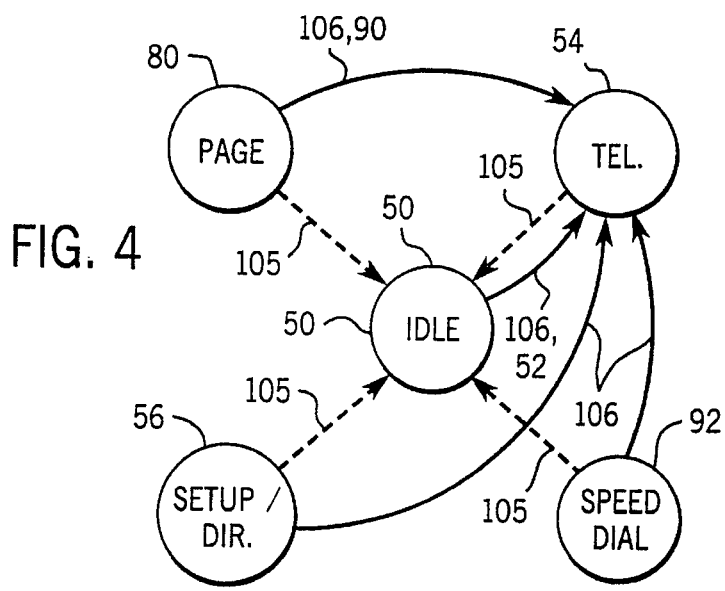
FIG. 4 is a simplified figure similar to that of FIG. 3 showing the mode changes invoked by a lifting of the handset of FIG. 2 or pressing a hardwired ESCAPE key.

Referring now to FIG. 4, pressing the escape key 29 moves from any mode 80, 54, 92, or 56 to the idle mode 50 as indicated by state change arrows 105 and thus provides a single method for the user to terminate any mode and move to a familiar starting mode. This simplification of the topology of the multiple modes of the combined unit 10 prevents user confusion that might result from significantly increasing the functionality of a standard telephone. Similarly from any of the modes 80, 50, 92 and 56, lifting up the handset 16, as indicated by state change arrow 106, puts the combined unit 10 into the telephone mode thus accommodating the natural reaction of a user to lift the handset when an incoming call is received or it is desired to make an outgoing call. The only exception to this rule is when an alpha page has been initiated and the ASCII modulator 38 is operating. In this case, as was described, the handset 16 is muted to prevent interference and the lifting of the handset 16 does not transfer the combined unit 10 to the telephone mode 52.

The use of this common handset signal to change the mode of the combined unit 10 rather than simply to connect or disconnect the combined unit 10 from the telephone line 30, as it is used in a conventional telephone system, enables a user unfamiliar with the paging system to use the combined unit 10 as a normal telephone without concern for the added functionality added by the AED.

The above description has been that of a preferred embodiment of the present invention. It will occur to those that practice the art that many modifications may be made without departing from the spirit and scope of the invention. For example, the designated mode keys 26–29 could be predetermined combinations of other keys. In order to apprise the public of the various embodiments that may fall within the scope of the invention, the following claims are made.

We claim:

1. A combination telephone and alphanumeric entry device unit, the combination unit comprising:

a keyboard having keys generating key signals when activated by a user, the keys including a page mode key and a speed dial mode key;

a modulator for transmitting telephone signals and paging signals on a phone line;

an electronic memory holding names linked to at least one of a voice telephone number and a page telephone number;

a microprocessor communicating with the keyboard, the electronic memory and modulator, and operating according to a stored program to:

(i) receive key signals identifying a name;

(ii) search the electronic memory to identify at least one of a voice telephone number and a page telephone number linked to the name;

(iii) if the page mode key is pressed and a page telephone number has been obtained in step (ii) returning to the user the page telephone number;

(iv) if the speed dial mode key is pressed and a voice telephone number has been obtained in step (ii) returning to the user the voice telephone number.

2. The combination telephone and alphanumeric entry device unit recited in claim 1 wherein the microprocessor returns the telephone number of steps (iii) and (iv) to the user by activating the modulator to output phone signals to dial the telephone number.

3. The combination telephone and alphanumeric entry device unit recited in claim 1 wherein electronic memory also links the name to a pager type and a pager identification number and wherein if the pager type is an alphanumeric type the microprocessor returns the telephone number of steps (iii) and (iv) to the user by activating the modulator to output phone signals to dial the telephone number and to output pager signals to transmit the pager identification number.

4. The combination telephone and alphanumeric entry device unit recited in claim 1 including a telephone handset fitting within a cradle when not in use, and a handset switch providing a handset up signal indicating the handset has been removed from the cradle wherein electronic memory also links the name to a pager type and a pager identification number and wherein if the pager type is a numeric type the microprocessor returns the telephone number of steps (iii) and (iv) to the user by activating the modulator to output phone signals to dial the telephone number when the handset up signal is received.

5. A combination telephone and alphanumeric entry device unit, the combination unit comprising:

a keyboard having keys generating key signals when activated by a user, the keys including a page mode key and a speed dial mode key;

an alphanumeric display;

a modulator for transmitting telephone signals and paging signals on a phone line;

an electronic memory holding names linked to at least one of a voice telephone number and a page telephone number;

a microprocessor communicating with the keyboard, the electronic memory, and the modulator, and operating according to a stored program to:
   (i) display a prompt on the display requesting a name upon the activation of one of the page mode key and the speed dial mode key of the keyboard;
   (ii) receive key signals identifying a name;
   (iii) search the electronic memory to identify at least one of a voice telephone number and a page telephone number linked to the name;
   (iv) if the page mode key was pressed, returning to the user the page telephone number linked to the name in the memory;
   (v) if the speed dial mode key was pressed, returning to the user the voice telephone number linked to the name in memory.

6. The combination telephone and alphanumeric entry device unit recited in claim 1 wherein the microprocessor returns the telephone number of steps (iii) and (iv) to the user by activating the modulator to output phone signals to dial the telephone number.

7. The combination telephone and alphanumeric entry device unit recited in claim 1 wherein electronic memory also links the name to a pager type and a pager identification number and wherein if the pager type is an alphanumeric type the microprocessor returns the telephone number of steps (iii) and (iv) to the user by activating the modulator to output phone signals to dial the telephone number and to output pager signals to transmit the pager identification number.

8. The combination telephone and alphanumeric entry device unit recited in claim 1 including a telephone handset fitting within a cradle when not in use, and a handset switch providing a handset up signal indicating the handset has been removed from the cradle wherein electronic memory also links the name to a pager type and a pager identification number and wherein if the pager type is a numeric type, the microprocessor returns the telephone number of steps (iii) and (iv) to the user by activating the modulator to output phone Signals to dial the telephone number when the handset up signal is received.

9. A combination telephone and alphanumeric entry device unit, the combination unit comprising:

a keyboard having keys generating key signals when activated by a user, the keys including a page mode key;

a handset communicating audio messages between the user and the combination unit, the handset fitting within a cradle when not in use;

a handset switch providing a handset up signal indicating the handset has been removed from the cradle;

telephone line interface circuitry transferring telephone signals between the handset and the keyboard and a telephone line in a telephone mode and transferring paging signals between the keyboard and telephone line in a paging mode;

a microprocessor communicating with the interface circuitry, keyboard, handset switch, and operating according to a stored program to:
   (i) cause the selection of the paging mode in response to a key signal indicating activation of the page mode key only if the handset up signal is not present;
   (ii) cause the selection of the telephone mode in response to the handset up signal despite subsequent activation of the page mode key.

10. The combination telephone and alphanumeric entry device unit recited in claim 9 wherein the microprocessor operates according to the stored program to also:

(iii) cause the selection of the telephone mode in response to the handset up signal after selection of the paging mode unless the telephone line circuitry is transferring paging signals to the telephone line.

\* \* \* \* \*